United States Patent Office 3,425,506
Patented Feb. 4, 1969

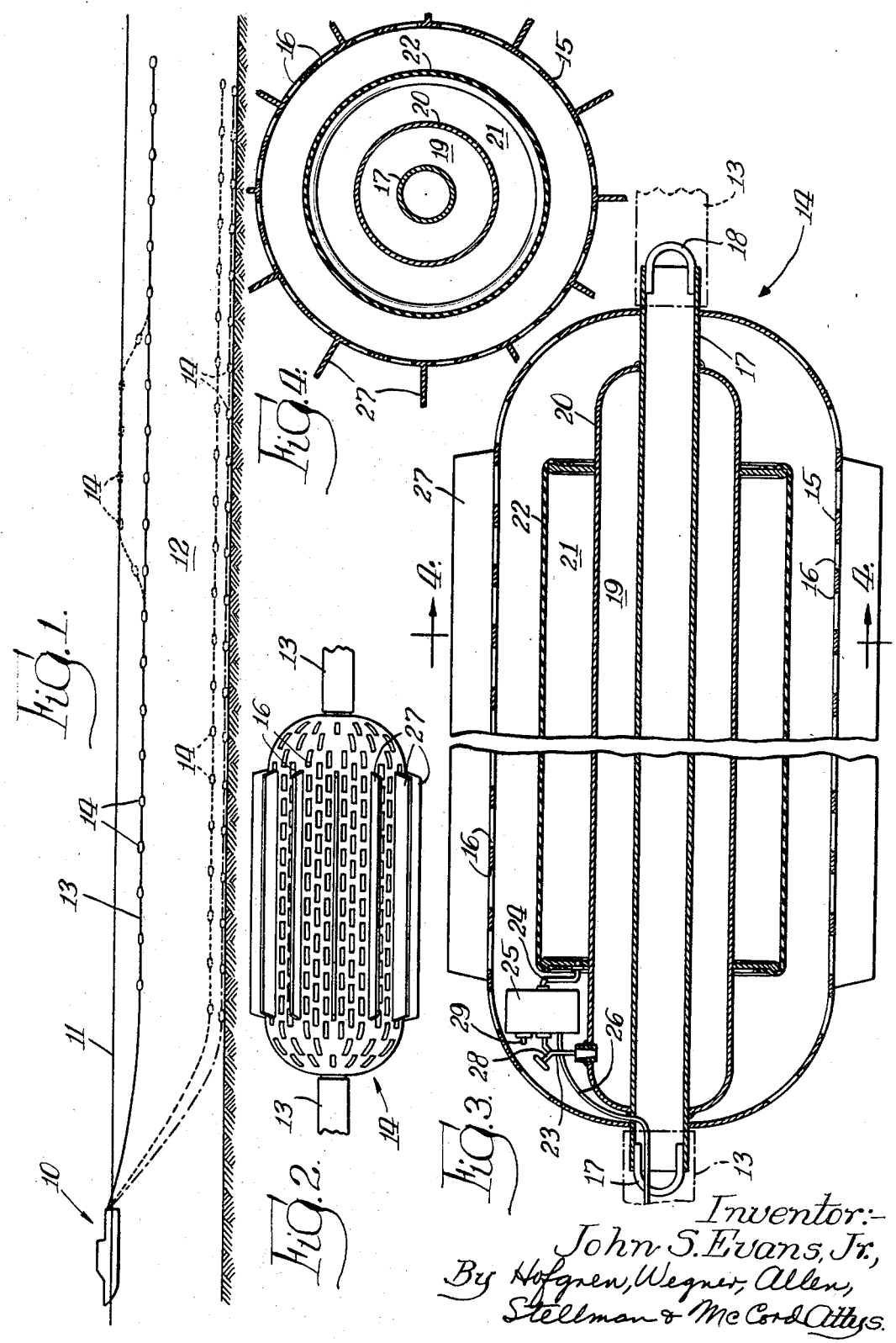

3,425,506
OFFSHORE SEISMIC STREAMER DEPTH CONTROL SYSTEM
John S. Evans, Jr., Houston, Tex., assignor to Mandrel Industries, Inc., a corporation of Michigan
Filed June 5, 1967, Ser. No. 643,541
U.S. Cl. 181—.5
Int. Cl. G01v 1/20
4 Claims

ABSTRACT OF THE DISCLOSURE

The invention provides a float for suspending, at predetermined depths, a streamer of geophones used in geophysical exploration work. The float includes presettable automatic means for creating a neutral buoyancy at the desired depth, together with individually selectable means for creating a positive buoyancy to bring the float and the streamer portion attached thereto to the surface.

---

This invention relates to a flotation device and more particularly to a flotation device adapted to be used to suspend a streamer of geophones at a predetermined depth for use in geophysical exploration.

It is a general object of the invention to produce a new and improved flotation device of the character described.

It is a more specific object of the invention to produce a flotation device equipped with means for establishing a neutral buoyancy condition of the device at a preselected depth.

It is a further object of the invention to produce a system utilizing a plurality of devices of the character described in the preceding paragraphs to suspend a streamer of geophones at a predetermined depth, together with individually selectable means for rendering one or more of such flotation devices positively buoyant so as to raise a desired portion of the streamer to the surface.

Seismic systems are commonly used in the exploration and mapping of subsurface formations and conditions notably in the search for subsurface conditions wherein oil is likely to be found. Inasmuch as a large quantity of oil is found in formations located under the sea, offshore exploration activities have been carried on for some time. In one system, a number of geophones for detecting echo waves from a disturbance are suspended beneath the surface of the sea and are towed so as to cover large areas of the sea. It has been customary in previous systems to suspend the geophones used in detecting echos from a number of surface floats, and the entire assembly is secured to the stern of a vessel which tows the same through the water.

In practicing the methods utilized heretofore as described above, a number of problems have arisen. In the first place, the use of surface buoys creates "noise" of low frequency which is detected by the geophones and is transmitted to the recording system, thereby confusing or obliterating desired signals simultaneously received by the geophones. The noise can be diminished somewhat by using fewer buoys, but the result of the greater spacing of the surface buoys causes the streamer of geophones to sag between points of suspension and thus the entire streamer is not maintained at a uniform depth. Another problem arises when servicing of some of the geophones or other units is required, as it is necessary to raise the entire section in order to service a portion.

According to the present invention, however, the problems attendant upon the use of the systems heretofore employed are eliminated. The invention contemplates the use of submersible flotation devices arranged to carry the streamer of geophones at a predetermined depth. Inasmuch as surface buoys are eliminated, the low frequency noise that attends the use thereof is also eliminated. Because of the elimination of such undesired noise, the flotation devices can be relatively closely spaced, preventing any sag of the streamer supported thereby, additionally, as the flotation devices may be individually raised (by being caused to become buoyant), sections of the streamer may be brought to the surface without the necessity of raising the entire streamer.

Other and further objects and advantages of the invention will be readily apparent from the following description and drawings, in which:

FIGURE 1 is a view showing the use of a number of flotation devices of the present invention supporting a streamer of geophones towed by a surface vessel;

FIGURE 2 is a side elevational view of a flotation device of the present invention;

FIGURE 3 is an enlarged longitudinal section through the apparatus shown in FIGURE 2; and FIGURE 4 is a vertical section taken along line 4—4 of FIGURE 3.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawings, there is shown a vessel 10 traveling on the surface 11 of a body of water 12. Streaming from the vessel 10 and towed thereby is a streamer 13 of geophones connected together in the usual manner for detecting and transmitting to suitable recording devices reflected waves from intentionally generated disturbances. The disturbances may take many forms such as, for example, the discharge of dynamite or the generation of a shock by other means.

The streamer 13 of geophones is supported by a plurality of flotation devices 14 each of which, as shown in FIGURES 2–4, includes an elongated cylindrical shell 15 provided with a plurality of rectangular perforations 16. A central tension tube 17 extends axially from end to end of the shell 15 and is provided at each end with tow eyes 18 to provide means for securing the spaced floats to each other and of supporting the geophones and attending electrical conduits thereby.

Within the shell 15 is a chamber 19 for fluid (such as air) under pressure, having a rigid outer wall 20 which also serves as the inner wall of a buoyancy chamber 21. In the embodiment shown in the drawings, the buoyancy chamber 21 is expandable by being provided with a flexible outer wall 22.

Means including the conduits 23 and 24 are provided for interconnecting the chambers 19 and 21 with the interconnecting means being controlled by a valve 25. The valve 25 is a pressure responsive control valve, i.e., a valve responsive to hydrostatic pressure to control the admission and/or exhaust of air under pressure from the pressure chamber to the expandable chamber. The control valve is also arranged to be operated by a solenoid (not shown) connected to electrical wires 26 so that the solenoid in each float may be operated from the vessel 10 to cause expansion of the expandable chamber and thereby create a positive buoyance in the float to cause the same to rise. Where air is used as the fluid in pressure chamber 19, compressed air may be introduced, as needed into the chamber by a filling line 28, while exhaust of air from the expandable chamber 21 is accomplished through the exhaust outlet 29.

In operation, the control valve 25 is manually set at the surface for the desired depth, it being understood that all the control valves in each of the floats shown in FIGURE 1 would be set to the same depth. When the streamer of geophones is streamed behind the vessel 10, the entire assembly sinks until the desired depth is reached as sensed by the pressure sensitive valve 25, which would then open to admit air under pressure to the expandable chamber 21 and subsequently inflate or deflate said chamber to create a condition of neutral buoyancy for all of the floats and the streamer supported thereby. Obviously, the valve 25 can be set to provide for shallow operation as shown in solid lines in FIGURE 1, or for deeper operation as shown by the dashed line. Bottom operation by intermittent actuation of valve 25 with the depth control preset to a valve deeper than actual bottom depth can be attained as shown by the second set of dashed lines. If any portion of the streamer requires surfacing, those floats supporting that portion of the streamer may be brought to the surface by actuating the solenoid to operate the valve 25 admitting additional air into the expandable chamber, thereby raising that portion of the streamer as shown in FIGURE 1. In the event it becomes expedient to raise the entire streamer temporarily, for example, to warn approaching vessels of the location of the streamer, all of the solenoids can be actuated simultaneously to raise the streamer to the surface. The wake created by the surfaced streamer and floats is readily visible and thus approaching vessels can be warned of the presence of the geophone assembly and avoid collision therewith.

While there has been shown and described a system wherein the fluid utilized to effect flotation is air, an air-over-liquid or air-over-water system such as used in submarine depth control systems may be used in lieu thereof. The use of a liquid rather than air gives the additional advantage arising from the fact that liquid is incompressible. The liquid, of course, should have a specific gravity of less than 1.0.

I claim:
1. A device of the character described comprising a hollow perforate cylindrical shell, a hollow tension tube extending axially from end to end through the shell, a chamber for fluid under pressure surrounding the tube within the shell, an expandable chamber surrounding the pressure chamber, means interconnecting said chambers, and a pressure responsive valve in said shell subject to the hydrostatic pressure of the medium in which the shell is immersed controlling said interconnecting means, said valve being settable to establish communication between said chambers in response to the hydrostatic pressure at a predetermined depth to admit fluid from said pressure chamber into said expandable chamber to create neutral buoyancy of the device at said predetermined depth.

2. A device of the character described comprising an elongated cylindrical perforate shell, a plurality of axially extending vanes on the exterior surface of the shell, a hollow tension tube extending axially from end to end through the shell, a chamber for fluid under pressure surrounding the tube within the shell, a chamber having a flexible wall and surrounding the pressure chamber, means interconnecting said chambers, a pressure responsive valve in said shell subject to the hydrostatic pressure of the medium in which the shell is immersed controlling said interconnecting means, said valve being settable to establish communication between said chambers in response to the hydrostatic pressure at a predetermined depth to admit fluid into said flexible chamber to expand the same to create neutral buoyancy of the device at said predetermined depth, and electromagnetic means for operating said valve from a remote position to modify the buoyancy of the device.

3. A device of the character described comprising an elongated cylindrical perforate shell, a plurality of axially extending vanes on the extrior surface of the shell, a hollow tension tube extending axially from end to end through the shell, means for securing apparatus to be suspended to said tube, a chamber for fluid under pressure surrounding the tube within the shell, a chamber having a flexible wall and surrounding the pressure chamber, means interconnecting said chambers, a pressure responsive valve in said shell subject to the hydrostatic pressure of the medium in which the shell is immersed controlling said interconnecting means, said valve being settable to establish communication between said chambers in response to the hydrostatic pressure at a predetermined depth to admit fluid into said flexible chamber to expand the same to create neutral buoyancy of the device and said suspended apparatus at said predetermined depth, electromagnetic means for operating said valve from a remote position to modify the buoyancy of the device, a solenoid in said device for independently operating said valve whereby to admit fluid into the said expandable chambers to create a positive buoyancy in the device.

4. A geophysical surveying apparatus for use in marine exploration work comprising a streamer of spaced electrically interconnected geophones, a plurality of flotation devices secured at spaced intervals along said streamer, each of said devices comprising an elongated cylindrical perforate shell, a plurality of axially extending vanes on the exterior surface of the shell, a hollow tension tube extending axially from end to end through the shell, means for securing said streamer to said tube, a chamber for fluid under pressure surrounding the tube within the shell, a chamber having a flexible wall and surrounding the pressure chamber, means interconnecting said chambers, a pressure responsive valve in said shell subject to the hydrostatic pressure of the medium in which the shell is immersed controlling said interconnecting means, said valve being settable to establish communication between said chambers in response to the hydrostatic pressure at a predetermined depth to admit fluid into said flexible chamber to expand the same to create neutral buoyancy of the device and said suspended apparatus at said predetermined depth, electromagnetic means for operating said valve from a remote position to modify the buoyancy of the device, a solenoid in each of said devices for independently operating said valve whereby to admit fluid into the said expandable chambers to create a positive buoyancy in each of a selected group of said devices.

References Cited

UNITED STATES PATENTS

| 2,632,150 | 3/1953 | Silverman et al. | 181—.5 |
| 3,193,853 | 7/1965 | Alexander | 9—8 |

FOREIGN PATENTS 845,476   8/1960   Great Britain.

BENJAMIN A. BORCHELT, *Primary Examiner.*

GERALD H. GLANZMAN, *Assistant Examiner.*

U.S. Cl. X.R.

340—7